United States Patent
Kroll et al.

(10) Patent No.: US 7,040,153 B2
(45) Date of Patent: May 9, 2006

(54) TIRE INFLATION GAUGE TECHNOLOGY

(75) Inventors: William P. Kroll, Medina, MN (US); Karl J. F. Kroll, Maple Grove, MN (US); Matthew Young, Golden Valley, MN (US)

(73) Assignee: Intercomp Company, Minneapolis, MN (US)

( * ) Notice: Subject to any disclaimer, the term of this patent is extended or adjusted under 35 U.S.C. 154(b) by 0 days.

(21) Appl. No.: 10/726,322

(22) Filed: Dec. 1, 2003

(65) Prior Publication Data

US 2005/0115327 A1    Jun. 2, 2005

(51) Int. Cl.
*E01C 23/00* (2006.01)
(52) U.S. Cl. .......................................... 73/146
(58) Field of Classification Search ............... 73/730, 73/146–146.8; 340/442
See application file for complete search history.

(56) References Cited

U.S. PATENT DOCUMENTS 5,429,166 A * 7/1995 Anzai et al. ................. 340/442
5,578,984 A * 11/1996 Nakajima .................... 340/442
6,445,287 B1 * 9/2002 Schofield et al. ............ 340/442
2002/0139288 A1 * 10/2002 Evans et al. ................ 116/34 R

* cited by examiner

*Primary Examiner*—Max Noori
(74) *Attorney, Agent, or Firm*—Skinner and Associates (57) ABSTRACT

A memory tire pressure gauge apparatus for use with race cars, comprising a pressure transducer, a control system and a display. The pressure transducer is for communicative connection to a tire of a race car. The control system is communicatively connected to the pressure transducer, receives tire pressure reading signals from the pressure transducer, and converts them to tire pressure display signals The control system has memory for storing a plurality of tire pressure reading signals. The display is communicatively connected to the control system, It indicates at least eight tire pressure readings simultaneously, the eight tire pressure readings corresponding to a relatively cold tire pressure reading with respect to an initial time and a relatively hot tire pressure reading with respect to a later time, after use of the tires, for each of four tires. The display further shows, simultaneously, four tire pressure change readings corresponding to changes caused by the use of each of the tires. The display receives tire pressure display signals from the control system. A method of gauging inflation pressure of a tire or other article is also disclosed.

18 Claims, 8 Drawing Sheets

Air Printout

```
INTERCOMP, U.S.A.
TEL:  763-476-2531

COLD  HOT   DIFF.
LF:    22.2  24.6  +2.4
LR:    22.2  24.4  +2.2
RF:    31.1  33.3  +2.2
RR:    31.0  33.3  +2.3
```

Top Display last lap #     last lap time
                           ▼                ▼

```
#1: 00:45.30       L01 01:29.68
#2: 01:12:02       L01 01:35.12
```

CAR #  MINUTES  SECONDS  HUNDREDTHS

FIG. 5

Lap Timer Printout

```
INTERCOMP, U.S.A.
TEL:  763-476-2531

*CAR #1*
  LAP  1:  1 MIN  2.56 SEC
  LAP  2:  1 MIN 12.67 SEC
  LAP  3:  1 MIN 22.50 SEC
  LAP  4:  1 MIN  5.66 SEC
   •       •       •
   •       •       •
      UP TO 100 LAPS
  LAP 100: 2 MIN  3.90 SEC

*CAR #2*
  LAP  1:  1 MIN 12.59 SEC
  LAP  2:  1 MIN 14.67 SEC
  LAP  3:  1 MIN 30.50 SEC
   •       •       •
   same format for CAR #3 and #4
```

TIRE INFLATION GAUGE TECHNOLOGY

CROSS-REFERENCE TO RELATED APPLICATIONS, IF ANY

Not applicable

STATEMENT REGARDING FERERALLY SPONSORED RESEARCH OR DEVELOPMENT

Not applicable

REFERENCE TO A MICROFICHE APPENDIX, IF ANY

Not applicable

BACKGROUND

1. Field

The present invention relates, generally, to measurement apparatus and methods. More particularly, the invention relates to tire pressure measurement apparatus and methods. Most particularly, the invention relates to a system, apparatus and method for measuring or gauging the inflation pressure of tires on or used for specialty and high performance vehicles. The invention is especially suitable for high performance racing automobile tires. The techniques of the invention can also be used in other fields wherein inflation or pressurization of articles, particularly inflatable articles, is required, such as but not limited to, aviation, aeronautics, military technology and the like.

2. Background Information

Existing technology, in general, includes various apparatus and/or methods for gauging the inflation pressure of pneumatic articles such as tires. In the past, the inflation pressure tires of cars, trucks, industrial or agricultural machinery, tractors, buses, carts, aircraft, motorcycles, scooters, bicycles and the like have been measure with mechanical and pneumatic means. These means are satisfactory for most tire applications. However, specialized tires on specialty vehicles such as high performance racing automobiles and aircraft for example, have specialized inflation needs for which traditional means are unsatisfactory. In particular, inaccuracies in inflation pressure of tires negatively effects the performance of high performance racing tires running at high speeds and high temperatures. Thus, the tires of racing vehicles must be checked frequently and quickly. Also, racing vehicle tires often require specialized inflation tuning, especially in situations where vehicles turn in one or predominantly one direction only, such as on oval race tracks or courses.

The above described background technology is believed to have significant limitations and shortcomings in terms of providing an optimum combination of functionality, reliability, and speed and ease of use. Thus, a need exists for the present invention.

All US patents and patent applications, and all other published documents mentioned anywhere in this application are hereby incorporated by reference in their entirety.

BRIEF SUMMARY

The present invention provides an inflation gauge apparatus and method which is practical, reliable, accurate and efficient, and which is believed to fulfil a need and to constitute an improvement over the background technology.

In one aspect, the invention provides an inflation gauge apparatus comprising a pressure transducer; a control system communicatively connected to the pressure transducer; and a display communicatively connected to the control system that indicates at least four pressure readings at the same time.

In another aspect, the invention provides a memory tire pressure gauge apparatus for use with race cars, comprising:

(a) a pressure transducer adapted for communicative connection to a tire of a race car;

(b) a control system communicatively connected to the pressure transducer, the controller receiving tire pressure reading signals from the pressure transducer and converting them to tire pressure display signals, the controller having memory for storing a plurality of tire pressure reading signals; and (c) a display communicatively connected to the control system that indicates at least eight tire pressure readings simultaneously, the eight tire pressure readings corresponding to a first, relatively cold, tire pressure reading with respect to a first or initial time and a second, relatively hot, tire pressure reading with respect to a second or later time for each of four tires, the display further showing, simultaneously, four tire pressure change readings corresponding to changes with respect to time of each of the tires caused by use, and heating, of the tires, the display receiving tire pressure display signals from the control system.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIGS. 14 *a* and *b* are schematic views of an embodiment of the circuitry of the apparatus.

DETAILED DESCRIPTION

FIGS. 1–5, show an embodiment of the tire purging and inflation apparatus of the present invention, generally indicated by the reference numeral 10. The embodiments of the invention described is intended to be illustrative and not to be exhaustive or limit the invention to the exact forms disclosed. The embodiments are chosen and described so that persons skilled in the art will be able to understand the invention and the manner and process of making and using it.

The article inflation gauge apparatus 10 and method is compact for easy storage and transport. The inflation gauge apparatus 10 is useable to easily, quickly and portably measure the contained pressure of articles, preferably inflatable articles such as tires. Inflation pressure capabilities range from near 0 to 100 pounds per square inch (PSI) with an accuracy of +/−0.5% of applied pressure.

STRUCTURE

Figure 1:
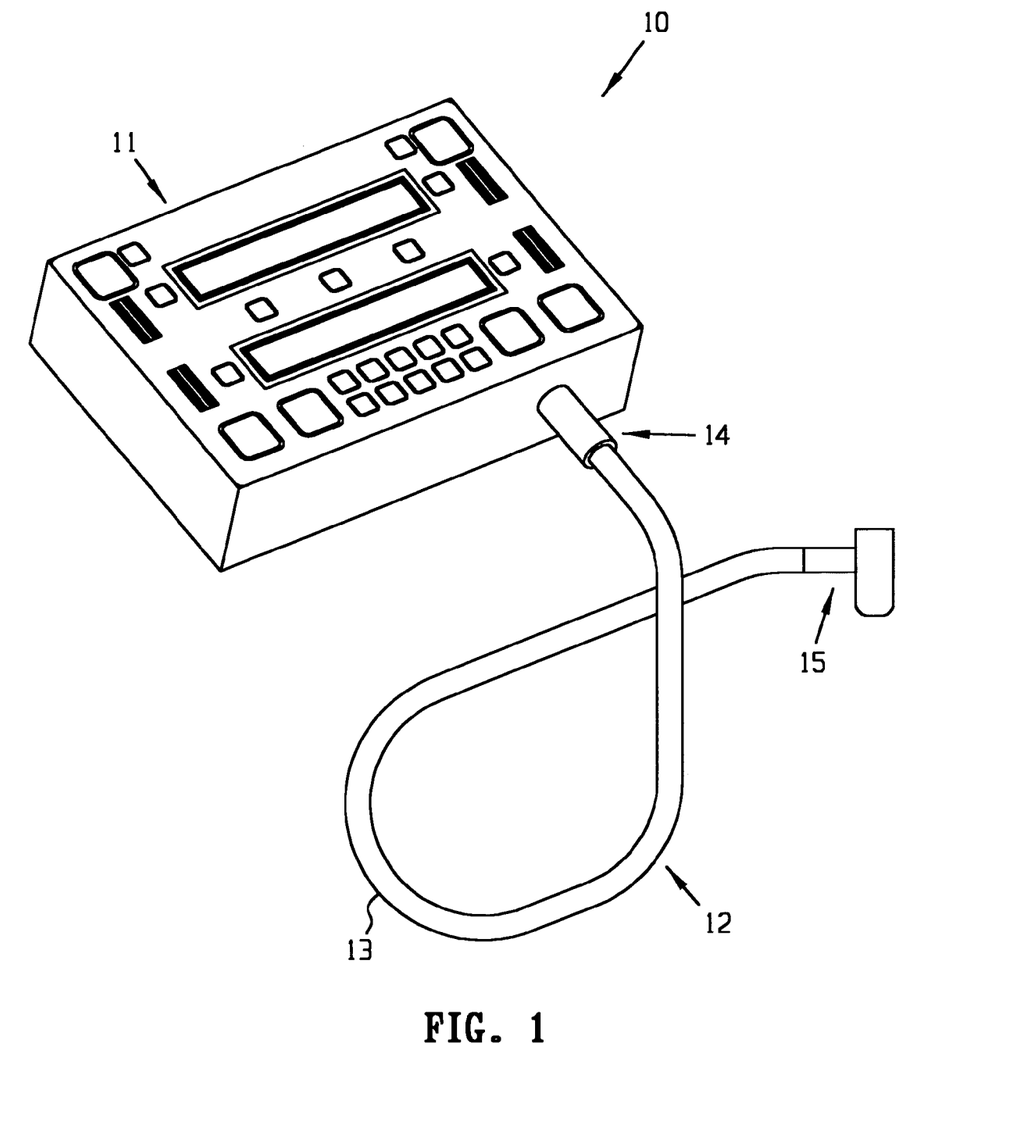
FIG. 1 is a perspective view of an embodiment of the inflation gauge apparatus and method of the invention.

Referring to FIG. 1, the tire inflation gauge apparatus 10 basically comprises a control unit 11 and a connection hose 12. The connection hose 12 includes a flexible hose member 13 of a predetermined length of approximately two feet. The hose member 13 has proximal end which is communicatively coupled to the control unit 11 by a connector 14. A tire coupler 15 is connected to the distal end of the hose member 13.

Figure 2:
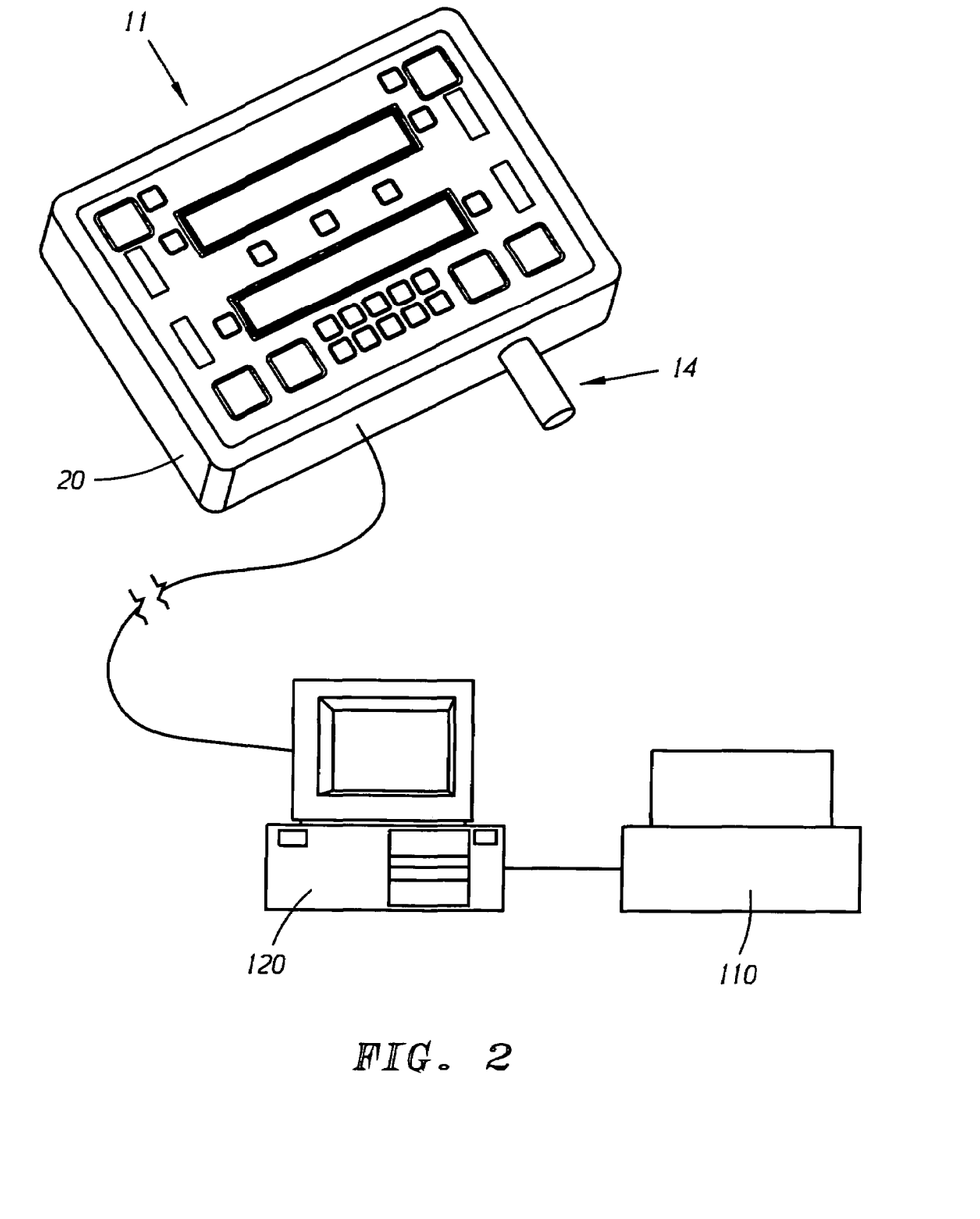
FIG. 2 is a perspective view of an embodiment of the control box of the apparatus.
Figure 3:
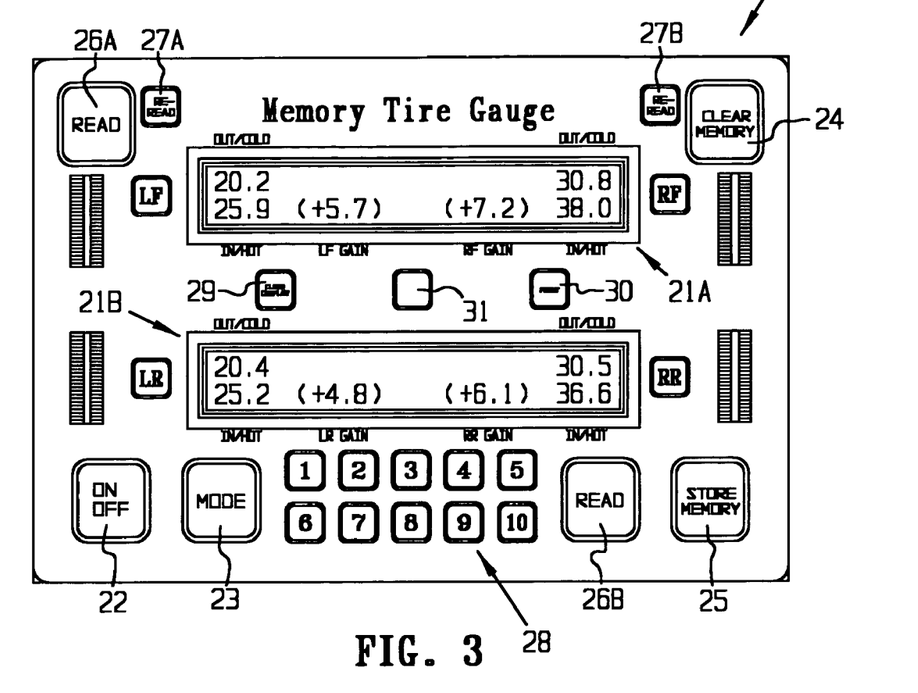
FIG. 3 illustrates an embodiment of the control panel of the control box.

FIGS. 2 and 3 show an embodiment of control panel 20 of the control unit 11. The panel 20 has several switches or buttons, and at least one display 21 *a* and *b*. The switches preferably include an ON/OFF switch 22, a MODE switch 23, a CLEAR MEMORY switch 24, STORE MEMORY switch 25, a pair of READ switches 26, a pair of RE-READ switches 27*s*, numerical key pad digits (1–10) 28, a CLEAR DISPLAY switch 29, a PRINT switch 30, and a BACK LIGHT switch 31. Switches are preferably membrane type switches, although other types of switches may be used consistent with the invention. The displays 21 are preferably 24 character displays. Preferably, the displays 21 are LCD type displays although other types of displays may be used consistent with the invention. In a pressure gauging mode, each display 21 displays first and second pressure readings for two tires and the gain (positive or negative difference) between each first and second reading. Thus, for example, display 21*a* shows the first or cold reading for the left front tire (LF), the second or hot reading for LF, the gain (difference in temperature) between the first and second readings for LF, the first or cold reading for the right front tire (RF), the second or hot reading for RF, and the gain between the first and second readings for RF. Display 21*b* shows the first or cold reading for the left rear tire (LR), the second or hot reading for LR, the gain (difference in temperature) between the first and second readings for LR, the first or cold reading for the right rear tire (RR), the second or hot reading for RR, and the gain between the first and second readings for RR. Preferably, symbols or markings are placed on the panel 20 adjacent to the displays 21 for ease of operator reading.

The displays 21*a* and *b* are capable of displaying at least four pressures at one time corresponding to pressures of each of four tires with respect to a point in time. Preferably, the displays 21 display eight pressures at one time corresponding to pressures of each of the four tires at two different times. Most preferably, the displays 21 additionally show four pressure change readings corresponding to the changes with respect to time of each of the four tires. Storage capability of the apparatus permits storing of a plurality of total readings (4 cold, 4 hot, and 4 changes), for example ten (10), which may be recalled on the displays 21. The unitary design of the control panel 20 with displays or a display which indicates a plurality of readings from a plurality of articles, for example cold pressure, hot pressure and pressure change from each and every tire of a race car permits race technicians to determine tire performance quickly and efficiently and thus enables faster and more efficient tuning of the car's tires.

Figure 7:
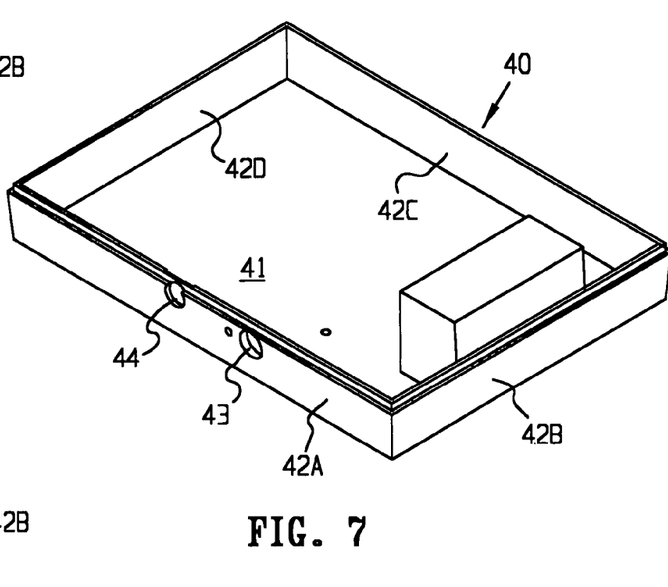
FIG. 7 is a perspective view of an embodiment of the housing base element.
Figure 8:
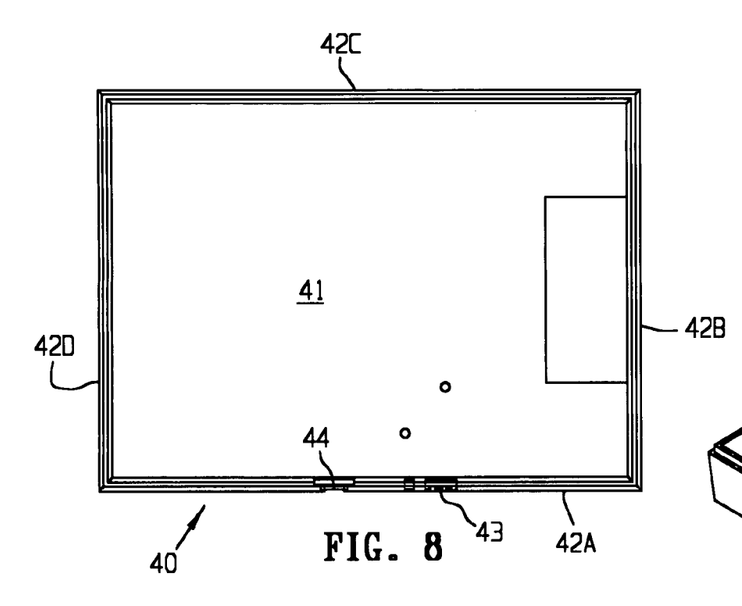
FIG. 8 is a top plan view of the housing base.
Figure 9:
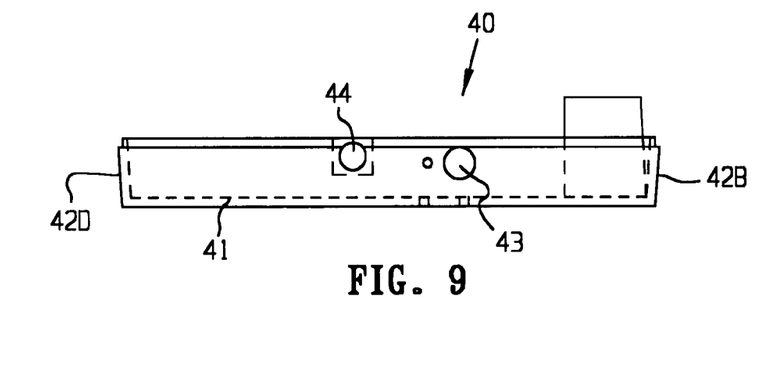
FIG. 9 is a side elevation view of the housing base.
Figure 10:
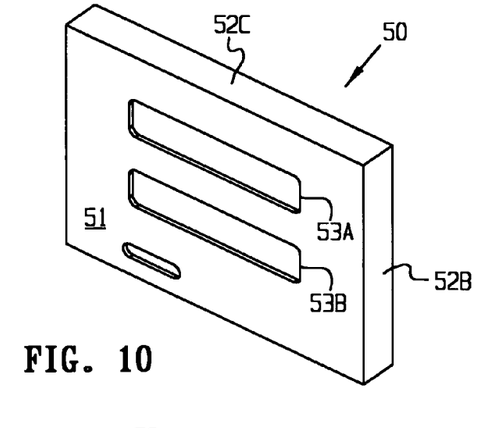
FIG. 10 is a perspective view of an embodiment of the housing top element.
Figure 11:
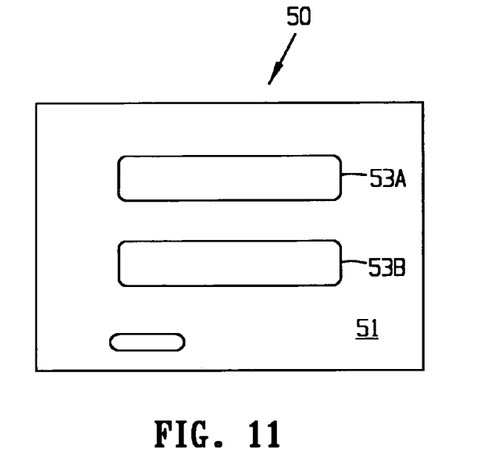
FIG. 11 is a top plan view of the housing top.
Figure 12:
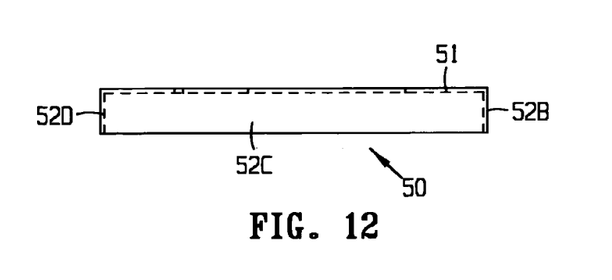
FIG. 12 is a side elevation view of the housing top.
Figure 13:
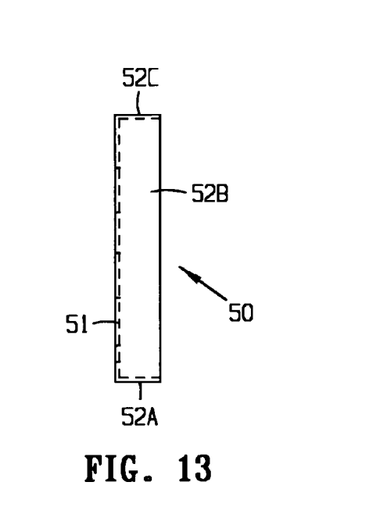
FIG. 13 is an end elevation view of the housing top.

FIGS. 7–9 show an embodiment of the housing base 40 of the control unit 11. The housing base 40 is shown to have a rectilinear, preferably rectangular, configuration with a bottom panel 41 and low profile side panels 42*a–d*. Aperture 43 disposed in side panel 42*a* accepts proximal connector 14. Aperture 44 accepts a serial connector (not shown).

FIGS. 10–13 show an embodiment of the housing cover 50 of the control unit 11. The cover 50 is shown to have a rectilinear, preferably rectangular, configuration which is designed to mate with the housing base 40. The cover 50 has a top panel 51 and low profile side panels 52*a–d*. Apertures 53 *a* and *b* permit viewing of displays 21 *a* and 21 *b* respectively.

Figure 14A:
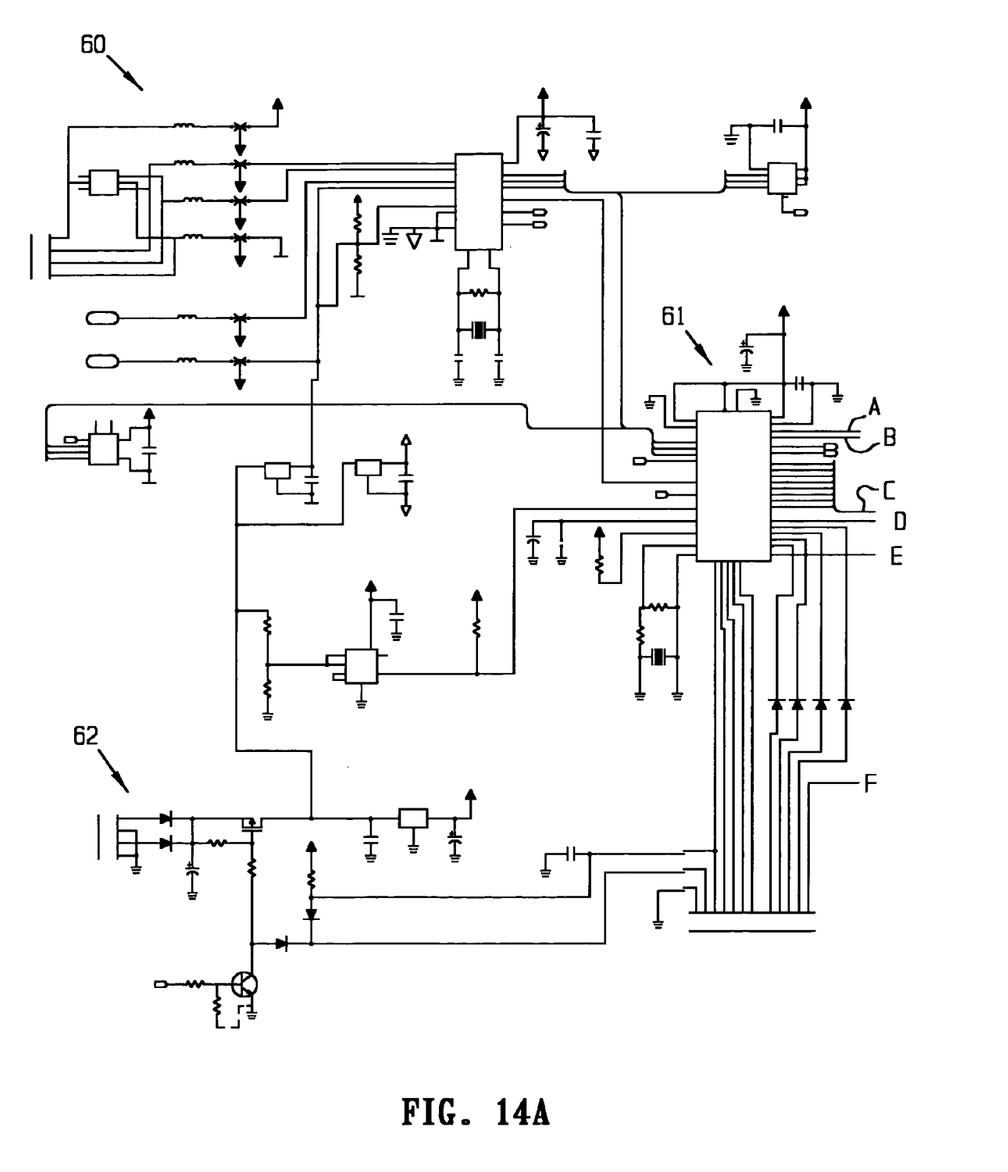
Figure 14B:
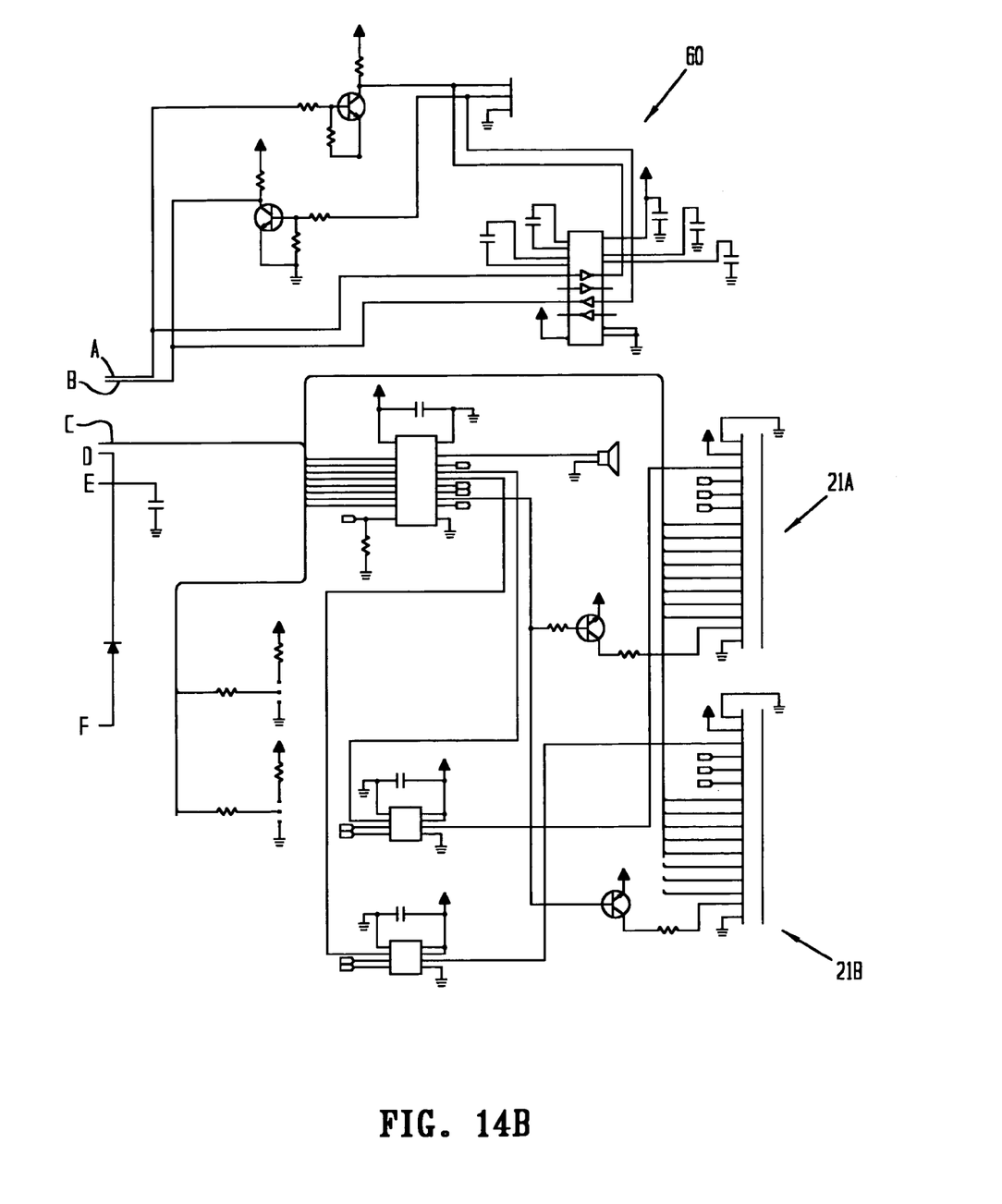

FIGS. 14*a/b* show an embodiment of the electronic circuitry 60 of the control unit 11. The circuitry 60 comprises a microprocessor or controller 61 and a battery 62.

The microprocessor 61 controls the elements of the circuitry.

The control panel 20 preferably has a back light for viewing the panel 20 in dark or low light conditions. The back light is actuated by pressing a button 31 on the panel 20. Preferably, it has a control feature which automatically turns off the light after a predetermined period of time, for example approximately two minutes, to preserve battery power.

Figure 6:
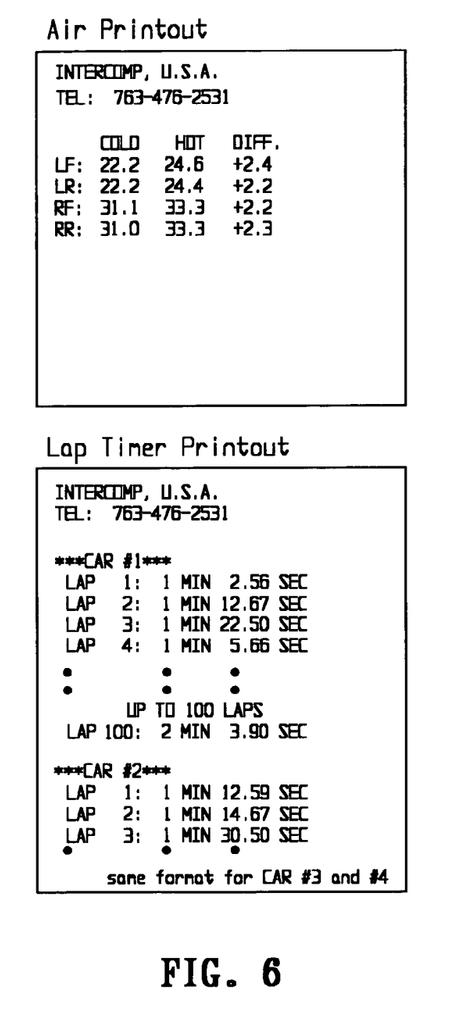
FIG. 6 illustrates an embodiment of printouts of the lap time and air pressure data from a printer connected to an embodiment of the apparatus of the invention.

The output receptacle is for connecting a printer 110, computer 120 or other serial peripheral device. The receptacle accepts 3.5 mm mini-plugs. The outer ring is GND, the middle ring is TXD and the center post is CTS. Output is standard RS232 format with 8 data bits, no parity and one stop bit. The baud rate of the serial output is adjustable to match the rate of the peripheral device at 1200, 2400, 4800, 9600, 19200 and 38400. Rate is selectable my pressing MODE and then PRINT. Keys 1–6 are used to select a rate and any key is pressed to exit. PRINT is pressed to print a ticket for example of the current display data. Print formats for "Air" and "Lap Time" are shown in FIG. 6.

Figure 4:
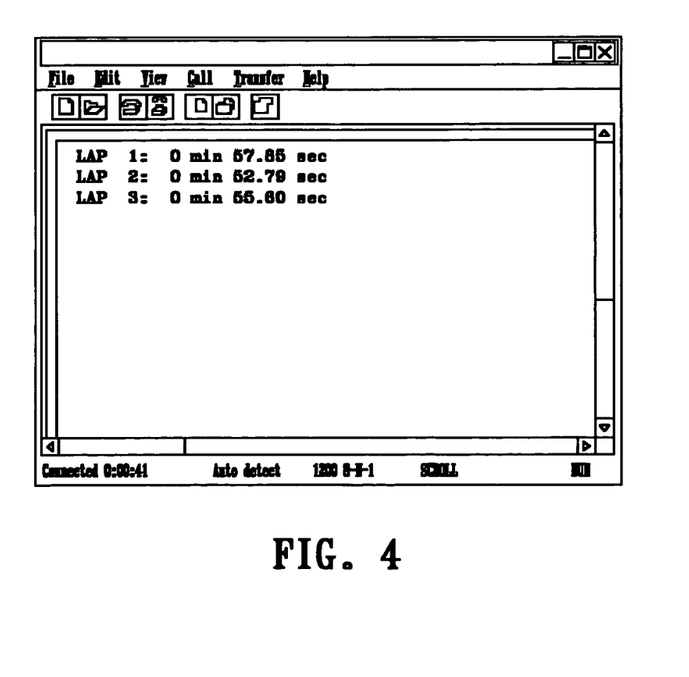
FIG. 4 illustrates an embodiment of hyper terminal display data generated by the apparatus of the invention and displayed on an exemplary computer communicatively connected to the apparatus.

Referring to FIG. 4, display data may be communicated to a computer connected via the serial data receptacle. Information may be transferred via HyperTerminal feature of Microsoft Windows 95, 98, and NT. Typically this program is started by this sequence: Start Menu- - - Program - - - Accessories - - - HyperTerminal - - - HyperTerminal. After making the connection from your Lap Timer to the computer, follow steps (The connector to the computer will be a 9-pin D-sub. The serial connection must be configured as a COMx port.):

1. A window titled "Connection Description" will be displayed. Enter any name into the text field. Choose any of the connection icons. Click 'OK'.

2. A window titled "Connect To" should be displayed. Find the text field labeled "Connect using:" In the drop down list select the serial port (COMx) you are using. If you only have one serial port it will be called "COM1". Click 'OK'.

3. In order for the computer to communicate, the data format must match the Tire Gauge's data format. The Tire Gauge can communicate with the following baud rates:

1200, 2400, 4800, 9600, 19200, 38400. In the text field "Bits per second:", select the baud rate you will use with the Lap Timer. The rest of the settings must be as follows: Data bits: 8, Parity: None, Stop bits: 1, Flow Control: Hardware 4. The connection should now be started. In the lower left corner a timer is active. To output data to HyperTerminal press PRINT. (Note: Nothin, will print if you do not have data saved or laps recorded.) To save connection settings, go to File/Save As . . .

FUNCTION

The tire gauge preferably has seven operating modes: (1) cold tire pressures, (2) hot tire pressures, (3) zero, (4) switch units, (5) lap timer, (6) lap recall, and (7) print. Referring to FIG. 3, modes are changes using the MODE key on the display. The cold tire pressures mode is the default mode upon start up. It permits reading tire pressures of up to four tires in a cold, unused or cooled down condition, beginning with the right front (RF) tire. The hot tire pressures mode permits reading of tire pressures immediately after use or otherwise a predetermined period of time after a cold condition readings are previously taken. The zero mode is used to zero the gauge apparatus with no pressure. Switch units mode permits switching or conversion of units of pressure measurement. Lap timer mode permits entering of lap times for correlation of tire pressures with lap times (and indirectly vehicle speed). Lap recall mode permits viewing of saved lap times. Print mode permits selection of baud rate for printouts to match particular printers.

Tire Pressure Measurements

To measure tire pressures on tires and to measure changes in pressures from a relatively cold (before use) state to a relatively hot (after use) state:

1. Press and hold (for about 1 sec) the ON/OFF key to turn the Memory Tire Gauge on.

2. Press CLEAR DISPLAY if there are any readings displayed which need to be cleared.

3. Decide on an order to take measurements. The default order to take readings is RF, RR, LR, LF. The first 4 readings correspond to the "OUT/COLD" readings, located on the top row of the display. The next 4 readings will be in the same order but will correspond to the "IN/HOT" readings which are located on the bottom row of the displays. See the "Read in any Order" section for alternatives to this order. The active position will have a right pointing arrow or a left pointing arrow next to the number. After each "IN/HOT" reading is completed, the "gain" is displayed in parentheses:

gain=IN/HOT pressure−OUT/COLD pressure

4. Place the air chuck onto the tire stem and press the READ key to record the pressure. The display will advance to the next open spot. If it is believed that a bad or mistake reading has been taken, the operator may press RE-READ to back up one reading.

5. When completed taking a set of readings the operator may store the readings in one of the 10 tire memory banks.

Tire Pressure Data Storage

To store measurement data in memory:

1. Press the STORE MEMORY key to store the current readings so they can be recalled later. The Tire Gauge will display "STORE TIRE READINGS IN WHICH MEMORY LOCATION? ENTER 1–10 TO SAVE (OPEN SPOTS: 12 4567 910)". The bottom line displays which memory locations are currently open. In the above example, only spots 3 and 8 have data stored, with the remaining spots open and available for use.

2. Press 1–10 to save the current readings to that memory slot, or press any other key to exit this screen without saving. After saving, the Tire Gauge will return to normal mode. NOTE: If you select a memory spot that already has data (such as spot 3 in the above example), the operator will be prompted with the display: "MEMORY LOCATION #03 ALREADY HAS DATA. PRESS [STO MEM] TO OVERWRITE (ANY OTHER KEY TO EXIT)".

3. Press "STORE MEMORY" to save over that spot, press any other key to return to normal mode.

To clear stored data from memory:

1. Press the CLEAR MEMORY key to clear the readings from a specific memory location. The Tire Gauge will ask "CLEAR TIRE READS FROM WHICH MEMORY LOCATION? ENTER 1–10 TO CLEAR (ANY OTHER KEY TO EXIT)".

2. Clear one of the ten memory locations by pressing the corresponding number (1–10) on the keypad. The Tire Gauge will then return to Normal mode.

To recall data from memory:

1. Press the number of the memory location (1–10) desired to be viewed (must be in normal mode to do this). For example if '3' is pressed, the display will read "RECALLING PRESSURES FROM TIRE MEMORY #03, PRESS [READ] TO CONFIRM(ANY OTHER TO EXIT)".

2. Press the READ key to confirm the recall, or press any other key to exit to normal mode.

To clear display of all readings:

1. Press CLEAR DISPLAY. If readings exist since a last save, the Tire Gauge will ask: "DO YOU WANT TO SAVE YOUR CURRENT READINGS? PRESS [STO MEM] TO SAVE PRESS [CLR DIS] TO CLEAR".

2. Press CLEAR DISPLAY a second time to clear the display, or press STORE MEMORY to store your current readings to one of the 10 memory slots (See the Store Memory section). Any other key pressed at this screen will bring the operator back to normal mode with the current readings still intact. . Memory Tire Gauge, Users Manual Measurement Units:

The Memory Tire Gauge can display in the following units: PSI, BARS, or KG/CM2. To switch to a different unit of measurement:

1. Press MODE, then

2. Press '4' for "SWITCH UNITS".

3. Press: '1' for PSI, '2' for BARS, or '3' for KG/CM2. The pressure unit setting will be saved in memory and the Tire Gauge will return to Normal Mode.

Read/Measurement Order

The default order to take tire pressure measurements is: OUT/COLD: RF, RR, LR, LF then IN/HOT: RF, RR, LR, LF. To take measurements in any order:

1. Press the RF, RR, LR, LF (right front, right rear, left rear, left front). These keys allow the user to measure the tires in any order that is desired.

2. To take readings from a specific tire press the key that corresponds to the desired tire. That tire's readings will be cleared, and the cursor will show the active pressure reading.

3. To start reading at the IN/HOT locations: press MODE, then press '2' for "HOT TIRE PRESSURES". The IN/HOT pressures will be read first, and the OUT/COLD pressures will be read next.

4. To start reading at the OUT/COLD locations: press MODE, then press '2' for "COLD TIRE PRESSURES". If RE-READ is pressed after manually moving to another position, the active cursor will move one spot back in the reverse default order. Memory Tire Gauge, Users Manual Lap Timing Measurements To record lap times:

1. Press MODE and then '5'. The Tire Gauge has 4 independent lap timers that can be displayed all at once.

2. To start one of the four lap timers, press the corresponding number (1–4) on the numeric keypad.

3. The next time the operator presses numbers 1–4, the current lap time will start over at 0:00 and the lap that was just timed will display on the right side of the display.

4. If the operator wishes to stop one of the lap timers without starting the timing for the next lap, press the corresponding number key below keys 1–4. For example, to stop lap timer #2 press the '7' key.

Figure 5:
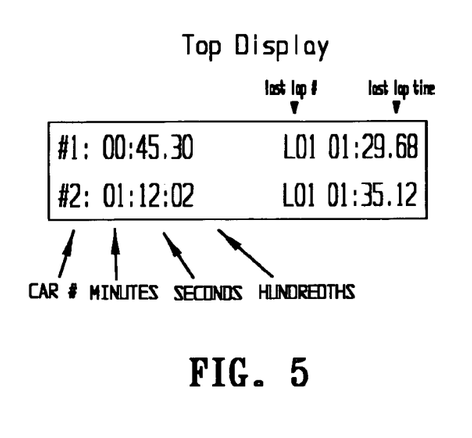
FIG. 5 illustrates an embodiment of the lap timer display readout.

Referring to FIG. 5, lap times will be saved in memory until you clear them. All lap times will be saved in memory until you clear them.

| TOP DISPLAY | | | |
|---|---|---|---|
| | | last lap # | last lap time |
| #1: | 00:45.30 | L01 | 01:29.68 |
| #2: | 01:12:02 | L01 | 01:35.12 | car # minutes/seconds/hundredths

Split times can be viewed (but not saved) by pressing and holding the READ key. The current lap time is still running in the background and returns to the display when the READ key is released.

5. Press MODE to exit from Lap Timer and go back to the Mode menu. Whenever one reenters Lap Timer mode, the timers will be reset to 00:00.00 but the last lap recorded will be displayed on the right. Note: If the Tire Gauge is turned off in Lap Timer mode, the Tire Gauge will default to Lap Timer mode when turned on again.

To clear lap times, the apparatus must be in Lap Timer or Lap Recall Mode:

1. Press MODE and '5' to get into lap timer mode.

3. To clear a lap time press CLEAR MEMORY (or CLEAR DISPLAY). The Tire Gauge will display "CLEAR THE LAP TIMES OF WHICH CAR NUMBER?

3. Enter keys 1, 2, 3, or 4 to clear that car number's lap time. Press any other key to exit.

To recall lap times the apparatus is set to Lap Recall Mode.

1. Press MODE and then '6'.

2. To recall a specific car's lap times select the car number by pressing keys 1, 2, 3, or 4.

3. Scroll through the lap times by pressing the LF and RF keys. To scroll by 10's use the LR and RR keys. Memory Tire Gauge, Users Manual Although the apparatus and method has been described in connection with the field of vehicle tire inflation, it can readily be appreciated that it is not limited solely to such field. The apparatus and method of the invention can be adapted to purge and/or fill various types of articles, particularly inflatable, pneumatic or other flexible or elastomeric articles.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof; including both structural equivalents and equivalent structures, material-based equivalents and equivalent materials, and act-based equivalents and equivalent acts.

What is claimed is:

1. An inflation gauge apparatus comprising:
   (a) a pressure transducer;
   (b) a control system communicatively connected to the pressure transducer; and
   (c) a display communicatively connected to the control system that indicates at least eight measured pressure readings at the same time, wherein the display shows at least eight pressures simultaneously corresponding to pressures of each of four articles at two different times.

2. The inflation gauge apparatus of claim 1, wherein the pressure transducer is adapted to be communicatively connected to a tire.

3. The inflation gauge apparatus of claim 2, further comprising a hose connected to the pressure transducer, the hose being for connection to the tire.

4. The inflation gauge apparatus of claim 1, wherein the control system includes a microprocessor.

5. The inflation gauge apparatus of claim 1, wherein the control system memory stores pressure data from successive articles comprising a four set sequence.

6. The inflation gauge apparatus of claim 5, wherein the memory stores data from a plurality of pressure measurement sequences.

7. The inflation gauge apparatus of claim 1, wherein the control system includes operator control switches.

8. The inflation gauge apparatus of claim 7, wherein the control system includes mode, read, and store switches.

9. The inflation gauge apparatus of claim 1, wherein the control system includes timing means.

10. The inflation gauge apparatus of claim 9, wherein the timing means measures lap time for a vehicle negotiating a course.

11. The inflation gauge apparatus of claim 1, wherein the control system includes output connection means.

12. The inflation gauge apparatus of claim 11, wherein the output connection means is connectable to a printer.

13. The inflation gauge apparatus of claim 11, wherein the output connection means is connectable to a computer.

14. The inflation gauge apparatus of claim 1, wherein the display is a pair of separate displays.

15. The inflation gauge apparatus of claim 1 wherein the display further shows, simultaneously, four pressure change readings corresponding to changes with respect to time of each of the articles.

16. The inflation gauge apparatus of claim 10, wherein the display further shows lap times.

17. An automobile tire pressure gauge apparatus comprising:
   (a) a pressure transducer adapted for communicative connection to a tire;

(b) a control system communicatively connected to the pressure transducer, the control system receiving tire pressure reading signals from the pressure transducer and converting them to tire pressure display signals, the control system having memory for storing eight tire pressure reading signals, the readings corresponding to actual pressures of each of the four tires of the automobile a first time and at second, later time; and (c) a display communicatively connected to the control system that indicates at least eight tire pressure readings simultaneously, the eight tire pressure readings corresponding to a first tire pressure reading with respect to the first time and a second tire pressure reading with respect to the second time for each of four tires, the display receiving tire pressure display signals from the control system.

18. A memory tire pressure gauge apparatus for use with race cars, comprising:

(a) a pressure transducer adapted for communicative connection to a tire of a race car;

(b) a control system communicatively connected to the pressure transducer, the control system receiving measured tire pressure reading signals from the pressure transducer and converting them to tire pressure display signals, the control system having memory for storing a plurality of tire pressure reading signals; and (c) a display communicatively connected to the control system that indicates at least eight measured tire pressure readings simultaneously, the eight tire pressure readings corresponding to a relatively cold tire pressure reading with respect to an initial time and a relatively hot tire pressure reading with respect to a time after use of the tires, for each of four tires, the display further showing, simultaneously, four tire pressure change readings corresponding to changes caused by use of the tires of each of the tires, the display receiving tire pressure display signals from the controller.

* * * * *